United States Patent [19]

Aaen

[11] 4,194,583
[45] Mar. 25, 1980

[54] SNOWMOBILE TRACTION LUG AND MOUNTING THEREFOR

[76] Inventor: Olav Aaen, 1266 N. Sheridan Rd., Kenosha, Wis. 53140

[21] Appl. No.: 883,459

[22] Filed: Mar. 6, 1978

Related U.S. Application Data

[63] Continuation of Ser. No. 739,725, Nov. 8, 1976, abandoned.

[51] Int. Cl.² .................................................. B62D 55/24
[52] U.S. Cl. ..................................... 180/190; 305/24; 305/35 EB; 305/54
[58] Field of Search ................ 305/35 EB, 38, 37, 54, 305/24, 25; 152/228, 230; 180/5 R

[56] References Cited

U.S. PATENT DOCUMENTS

| | | | |
|---|---|---|---|
| 3,572,851 | 3/1971 | Schuler | 305/35 EB |
| 3,690,741 | 9/1972 | Pierson | 305/38 |
| 3,703,321 | 11/1972 | Schoonover | 305/38 |
| 3,738,714 | 6/1973 | Ness | 305/35 EB X |
| 3,765,731 | 10/1973 | Kilbane | 305/35 EB |
| 3,809,442 | 5/1974 | Peterson et al. | 305/35 EB |
| 3,865,441 | 2/1975 | Jolliffe | 305/54 |
| 3,887,243 | 6/1975 | Chaumont | 305/35 EB X |

*Primary Examiner*—Charles A. Marmor
*Attorney, Agent, or Firm*—McGlynn and Milton

[57] ABSTRACT

A traction lug to be mounted on a snowmobile track-band, and being so positioned transversely under the track-supporting rails that the forces imposed thereon during travel will be directed symmetrically with respect to the rails so as to avoid distortion of the track-band and provide positive support therefor.

4 Claims, 5 Drawing Figures

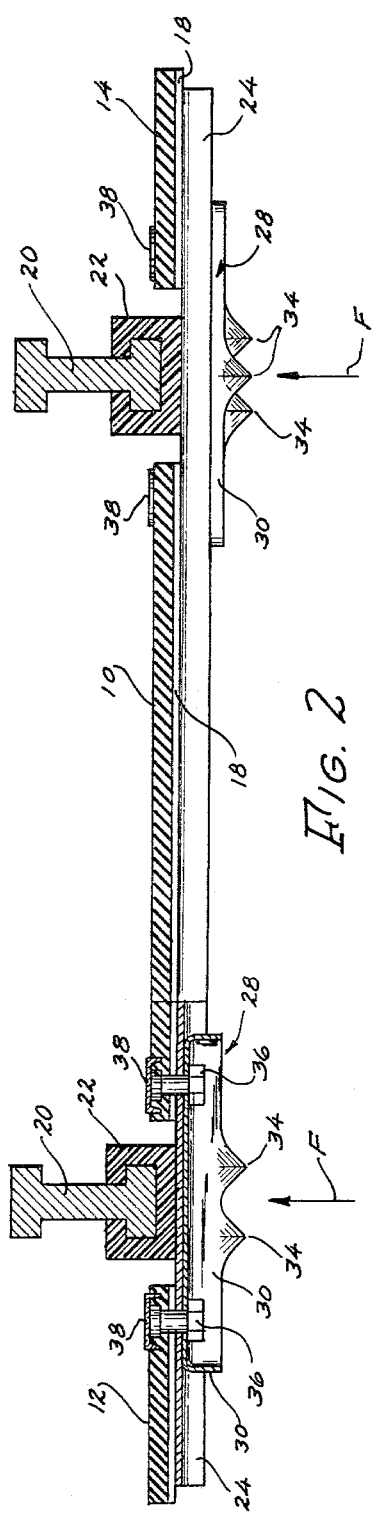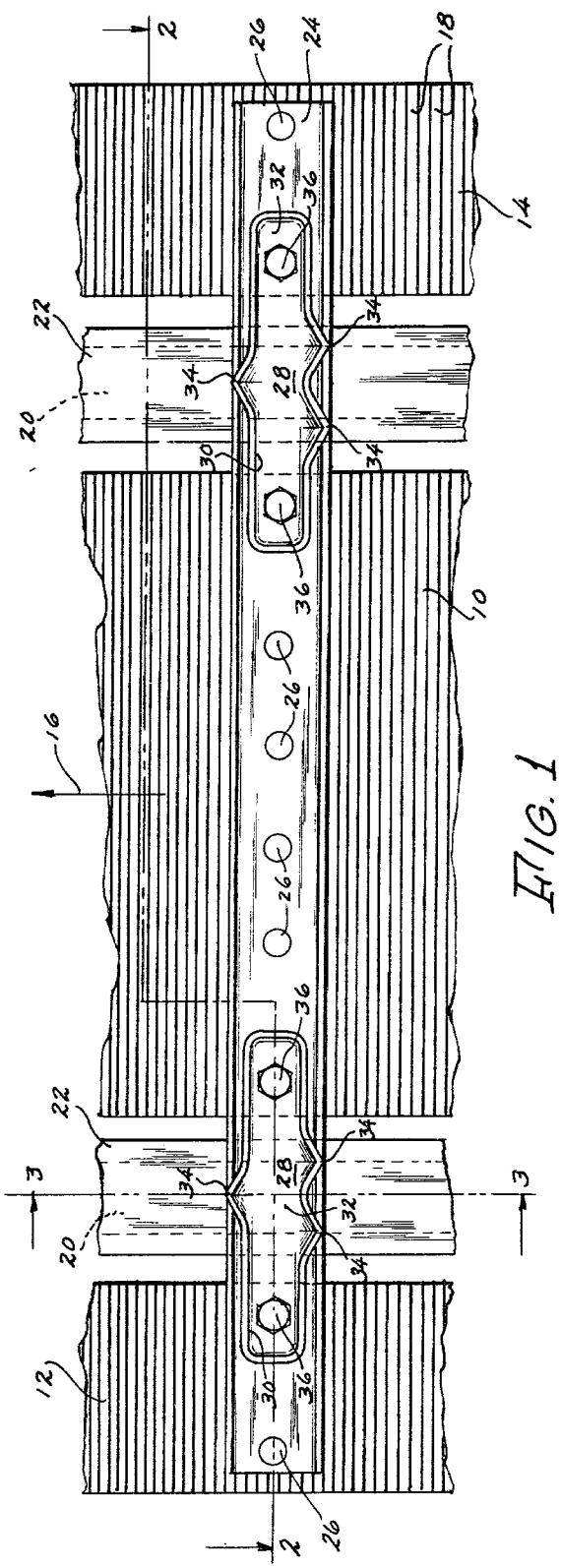

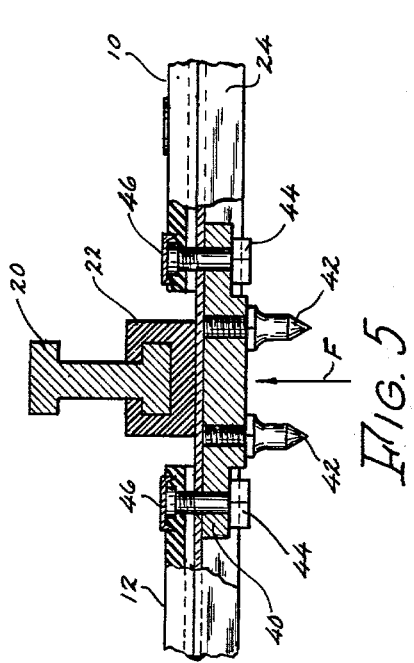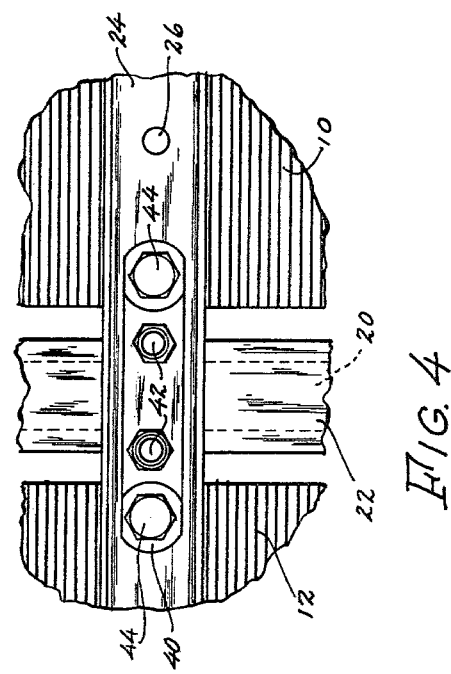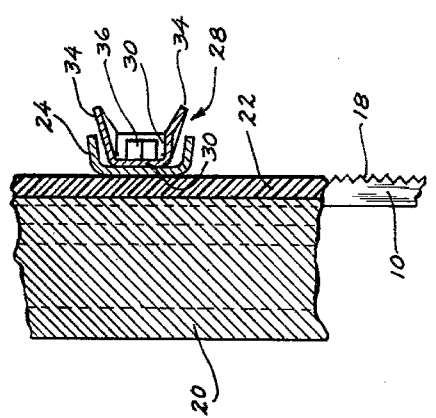

SNOWMOBILE TRACTION LUG AND MOUNTING THEREFOR

This application is a continuation of U.S. application Ser. No. 739,725 filed on Nov. 8, 1976 and now abandoned.

BACKGROUND OF THE INVENTION

1. Field of the Invention

This invention relates to snowmobile track-bands and the traction lugs affixed thereto, and also concerns the position of the lugs relative to the track-supporting rails and to novel elements of the lugs.

2. Description of the Prior Art

The prior art embraces track-bands having traction lugs mounted laterally and normally of the track-supporting rails in positions which fail to provide adequate support for the track-bands and thereby permit distortion of the bands.

SUMMARY OF THE INVENTION

This invention concerns the ground-engaging track-bands of snowmobiles, and which bands are provided with traction lugs spaced peripherally about the bands and which lugs engage the surface over which the vehicle travels and to provide traction therefor.

One object of this invention is to provide novel traction lugs which are so positioned transversely on the track-bands of the snowmobile that the upwardly directed forces resulting during travel are applied symmetrically to the track-supporting rails.

Another object is to provide traction lugs having plural points which are spaced longitudinally and transversely of the track-bands.

Referring to the drawings:

FIG. 1 is a portion of the track-band looking upwardly and normal to the plane thereof and embracing the traction lugs of this invention.

FIG. 2 is a section taken at 2—2 of FIG. 1.

FIG. 3 is a section taken at 3—3 of FIG. 1.

FIG. 4 shows a modified form of the traction lug.

FIG. 5 is a projection of FIG. 4 with parts removed.

Referring again to the drawings:

The traction band comprises a central band 10 and outer bands 12 and 14, which bands are spaced laterally and travel in the direction indicated by arrow 16 of FIG. 1. Bands 10, 12 and 14 are of fabric-reinforced rubber or similar suitable material and which are provided with transverse "ribbing" 18 to improve traction.

The frame of the snowmobile is provided with fore- and aft-extending track-supporting rails which are integral with the frame and indicated as 20; being laterally spaced intermediate the bands 10, 12 and 14, as shown in FIGS. 1 and 2. Nonmetallic shoe portions 22 are longitudinally integral with the lower portion of rails 20 and serve as a friction-reducing supporting surface for the track-band assembly as the latter slides in the direction indicated as 16 of FIG. 1.

The traction band comprising central band 10 and outer bands 12 and 14 are secured integrally as a unit by a plurality of channel bars 24, only one being shown, and which bars are directed transversely of the traction band and spaced apart longitudinally along the traction band. Channel bars 24 are secured integrally to traction bands 10, 12 and 14 by suitable bolts or rivets 26, thus resulting in a unitary track-band assembly. Channel bars 24 slidably engage the lower surface of shoe portions 22 when the snowmobile is in motion.

Traction lugs 28 are positioned in the channels of the bars 24 as to extend transversely of shoe portions 22 and symmetrically therewith. Lugs 28 are of steel and of cupped shape as shown, and have walls 30 and a bottom panel 32 which will provide sufficient rigidity. Walls 30 terminate in downwardly-directed spike portions 34 which extend below the walls of channel bars 24, as shown in FIGS. 2 and 3. One of the walls 30 terminates downwardly in a single spike and the other wall terminates in a pair of spikes positioned longitudinally and symmetrically with respect to the single spike. Lugs 28 are properly hardened so as to resist wear and are secured in the channel of bars 24 and bands 10, 12 and 14 by bolts 36 and nuts 38.

FIGS. 4 and 5 concern a modified traction lug comprising a bar 40 having laterally-spaced studs 42 threadedly inserted therein and having points to provide sufficient traction. Bolts 44 pass through bar 40, channel bar 24 and bands 10, 12 and 14. Nuts 46 secure bolts 44 in the assembly.

The advantages inherent in the above-described improvements with respect to snowmobiles is evident upon reference to FIG. 2. The upwardly-directed forces applied during operation of the snowmobile are indicated by the arrows F and are directed symmetrically with respect to the centers of rails 20. Therefore, any tendency for upward distortion of the track laterally of the rails 20 will be held to a minimum.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A snowmobile comprising; a fixed longitudinally-extending track-supporting rail, a longitudinally-propelled track including laterally-spaced plural bands of flexible material defining a longitudinal gap therebetween, said rail being positioned in said gap, a bar extending transversely across said track and secured to said bands, a transversely-extending traction lug extending across said gap, said lug having a at least one spike portion directed downwardly and extending below said bar and said bands, and securing means securing said lug to said bar on opposite sides of said rail, said securing means disposed upwardly of said spike portion.

2. A snowmobile as set forth in claim 1 wherein said securing means includes a pair of fasteners extending through said lug and through said bar, said fasteners being disposed on opposite sides of said rail.

3. A snowmobile as set forth in claim 2 wherein said fasteners comprise threaded bolts and nuts.

4. A snowmobile as set forth in claim 2 wherein said fasteners extend through said respective bands.

* * * * *